United States Patent [19]

Patel et al.

[11] 4,310,864
[45] Jan. 12, 1982

[54] CARTRIDGE LOADING AND UNLOADING MECHANISM

[75] Inventors: Dilip C. Patel; John D. Stricklin, both of Oklahoma City, Okla.; Bruno Koehne, Casselberry, Fla.

[73] Assignee: Magnetic Peripherals Inc., Minneapolis, Minn.

[21] Appl. No.: 45,484

[22] Filed: Jun. 4, 1979

[51] Int. Cl.³ .............................................. G11B 5/012
[52] U.S. Cl. ...................................... 360/97; 360/86; 360/133
[58] Field of Search ............................. 360/97, 98–99, 360/133, 86, 135

[56] References Cited

U.S. PATENT DOCUMENTS

| | | | |
|---|---|---|---|
| 3,416,150 | 12/1968 | Lindberg, Jr. | 360/97 |
| 3,593,327 | 7/1971 | Shill | 360/97 |
| 3,662,360 | 3/1972 | Lambert | 360/97 |
| 3,899,794 | 8/1975 | Brown, Jr. | 360/133 |
| 4,040,106 | 8/1977 | Medley | 360/99 |

*Primary Examiner*—John H. Wolff
*Attorney, Agent, or Firm*—Edward L. Schwarz; Joseph A. Genovese

[57] ABSTRACT

An improvement to allow easier detaching of a disk memory module from its magnetic attachment to the spindle of a front loading disk drive. In one such type of drive, manually pulling a door open actuates a track-mounted carrier which lifts the disk module from the spindle, breaking the magnetic attraction between them, and transporting the module to the open door for manual removal. To reduce the force necessary to break the magnetic attraction, this invention employs an actuator fixed to the carrier which engages a crank mechanism when the carrier is being pulled to the opening. The crank mechanism pushes against the underside of the module and assists its breaking loose from the spindle. A spring holds the crank assembly in position to re-engage the actuator when the carrier is in the module-detached position.

6 Claims, 5 Drawing Figures

CARTRIDGE LOADING AND UNLOADING MECHANISM

BACKGROUND OF THE INVENTION

One type of disk memory drive now coming into popularity employs a loading port for the associated memory module on a vertical face of the drive. Such a drive is described in U.S. Patent Application Ser. No. 949845 filed Oct. 10, 1978 by Loren Skarky, and having a common assignee with this application. Those portions of the Skarky application describing and showing the spindle, the cartridge and the magnetic coupling between them are hereby incorporated by reference into this application. This port has a hinge-mounted cover or door which is connected by a linkage to a module carrier within the drive. The purpose of the module carrier is to transport the module from its position with the disk hub magnetically mounted on the drive's spindle, to a position allowing manual removal of the module through the port, and also to permit loading of a module by the reversal of these operations. The magnetic coupling between the disk hub and the spindle is relatively strong, a substantial amount of force being required to break it. In the original design, the carrier is track-mounted, said track having a ramp section for lifting the carrier and the module carried by it up from the spindle and causing the hub to break away from the spindle, when the door is being opened. The relatively high forces involved cause excessive wear and fatigue on the linkage, tracks, and module to carrier attachment.

DESCRIPTION OF THE PRIOR ART

The closest art of which we are aware is described in U.S. Pat. No. 3,899,794, which uses a system of slotted tracks to lift and transport the module. The magnetic force holding the module hub to the drive spindle is broken by a compound mechanical advantage of a lever actuated by the initial motion of opening the drive's door. U.S. Pat. Nos. 3,593,327 and 3,800,325 show a simple lever extension of the door sealing the opening through which the modules are inserted and removed, to break the module from the spindle. Other patents, involving top loading drives, disclose pivoting of the module handle to provide the force needed to break the magnetic attraction between the hub and the spindle.

SUMMARY OF THE INVENTION

To overcome the strong magnetic attraction between the spindle and the disk hub, we have invented a linkage actuated by the carrier, which cooperatively with the carrier applies additional force to urge the module housing away from the spindle. It is easy to provide for a certain amount of free movement of the carrier before the ramp portions of the track which break and lift the module from the spindle are reached. During this free movement, the carrier movement torsionally deflects portions of the linkage and preloads the resilient plastic housing of the module thereby supplying a substantial portion of the force needed to break the hub from the spindle.

Accordingly, one object of this invention is to reduce the maximum force needed to detach such a carrier-supported module from the magnetic coupling to the spindle.

Another purpose is to reduce wear on the various elements of the drive and module.

Yet another purpose is to reduce shock loadings on the module during the moment of breakaway from the spindle.

Other purposes and aims of this invention will be evident from the description which follows.

DESCRIPTION OF THE PREFERRED EMBODIMENT

Figure 1:
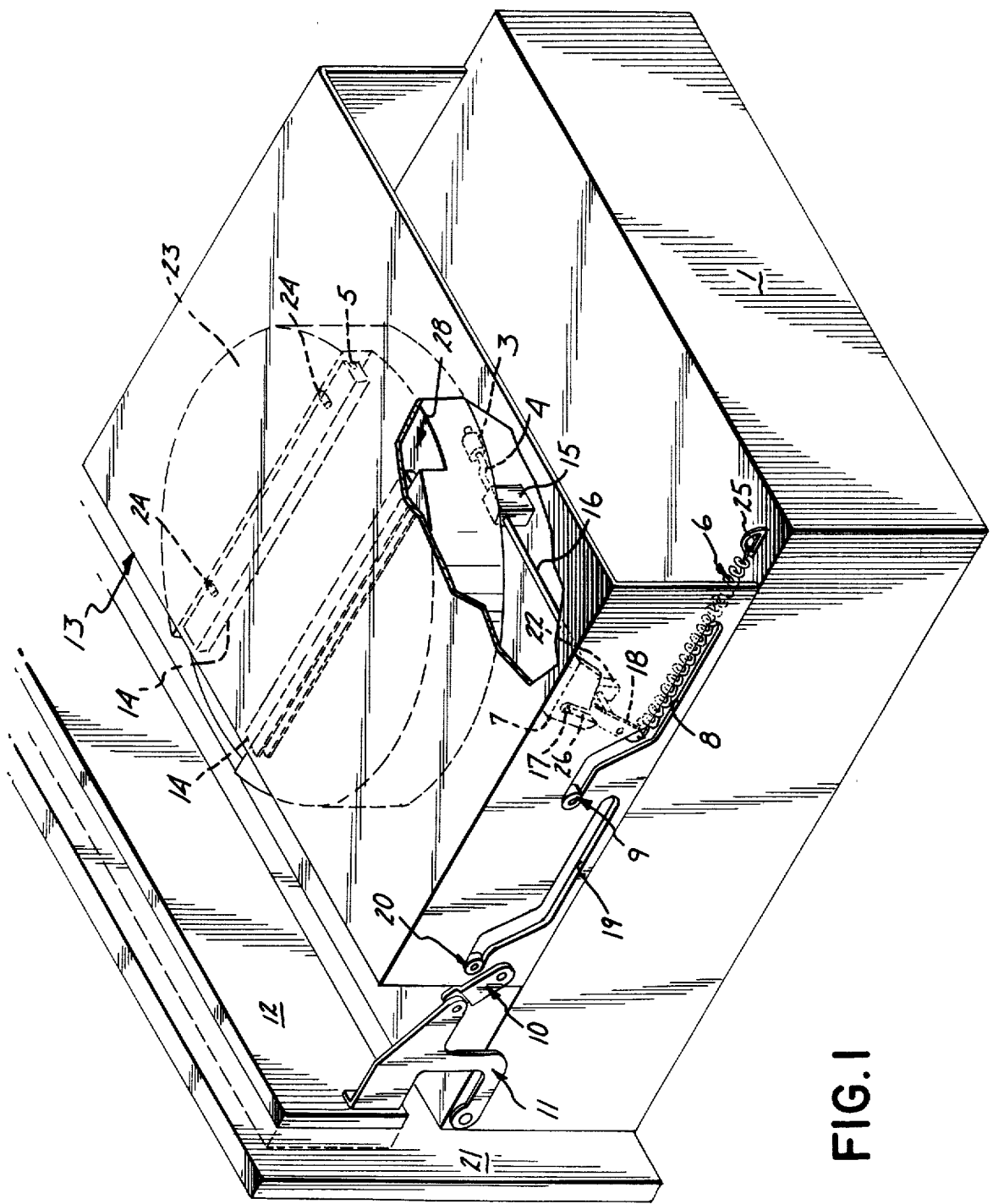
FIG. 1 is a perspective sketch of a typical drive unit incorporating the invention with the module in it mounted on the spindle.

In FIG. 1, a front loading disk drive of the type described in the previously mentioned Skarky application is shown with a module 23 mounted within it. Module 23 has inwardly projecting pins 24 set in the vertical walls of channel 28. The opposing vertical wall of channel 28 also carries similar opposing pins, not shown. Pins 24 rest within slots 5 in rails 14, thereby supporting the entire module. Rails 14 in turn are permanently attached to the underside of carrier frame 13. In fact, when module 23 is mounted on the drive spindle, rails 14 support only the housing of module 23, its internal recording disks and hub (not shown) being magnetically supported by the drive spindle. When module 23 is so mounted, the position of the housing of module 23 with respect to its internal disks and hub is arranged so that clearance exists to prevent rubbing as the disks and hub spin.

Figure 2:
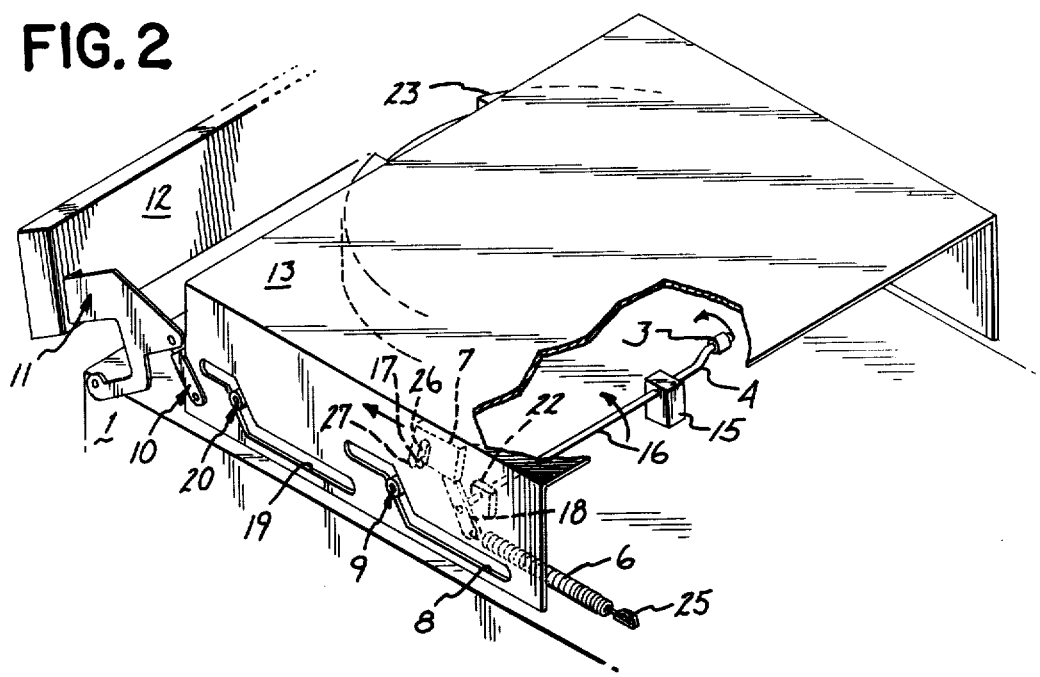
FIG. 2 is a similar perspective sketch at the point where the module has either just broken free of the spindle or, if the module is being newly mounted, just approaching the spindle to be magnetically grasped thereby.
Figure 3:
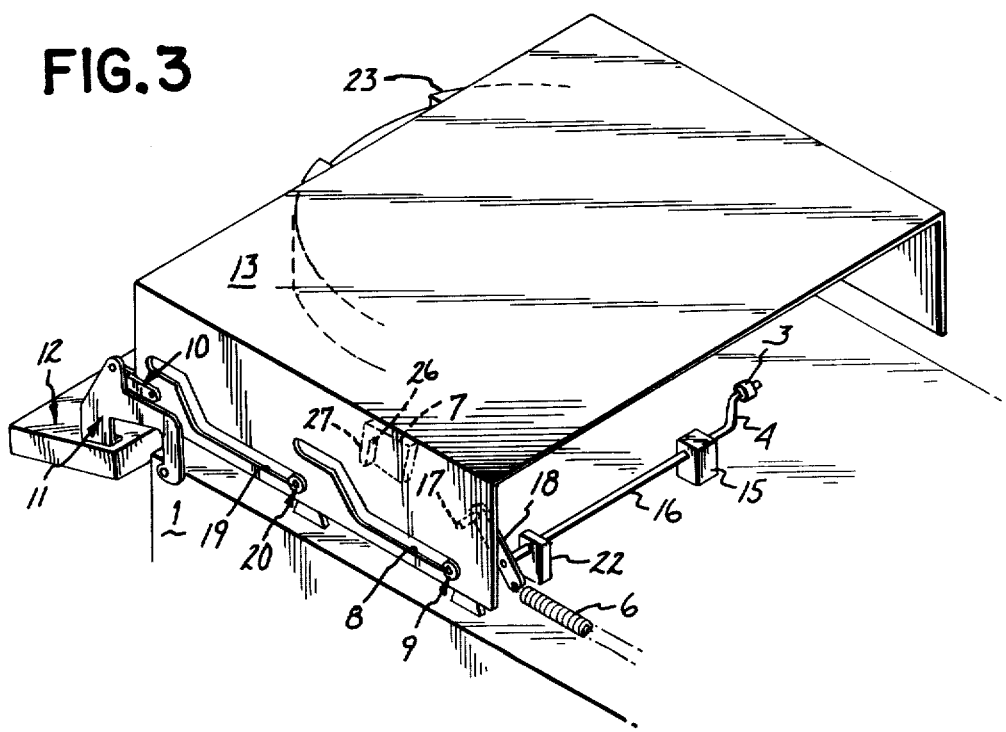
FIG. 3 is a sketch similar to that in FIGS. 1 and 2, with the module available for removal from the drive unit.

An operator desiring to remove module 23 from the drive unit grasps door 12 and pulls it downwards with a counter-clockwise rotation on bracket 11 and a similar bracket, not shown, on the opposite end of door 11, shifting door 12 from its closed position in FIG. 1 blocking a module removal port in front panel 21, through the partially open position shown in FIG. 2 to the completely open position shown in FIG. 3. Link 10 and a similar unshown link connect bracket 11 and the unshown bracket to carrier 13, and cause carrier frame 13 to translate both upwardly and to the left, detaching the disk hub from the spindle and shifting module 23 adjacent to the port in front panel 21. The operator can then remove module 23 by pulling it out of the port, pins 24 sliding in slots 5. Translation of carrier 13 is guided and supported by rollers 9 and 20 which are supported on members mounted on base or deck 1, and which roll in slot type tracks 8 and 19. Similar unshown rollers and slot type tracks guide and support the opposing side of carrier 13.

As explained in the Skarky application, the disk hub is preferably clamped to the spindle by permanent magnets, and centered thereon by a centering mechanism. These magnets are relatively high flux items, so as to prevent any possibility of accidental detaching or shifting between the hub and the spindle. The great attractive force requires a relatively large force to break the hub away from the spindle when carrier 13 is transporting module 23 to the port in panel 21 for removal. This large force causes more wear than desirable on slots 5, pins 24, and tracks 8 and 19. The high breakaway force requires relatively high peak opening force for door 12. When breakaway occurs, natural resilience in the members causes a relatively high momentary shock load on module 23. For all these reasons, apparatus for simply and reliably increasing breakaway force on module 23 is advantageous.

Figure 4:
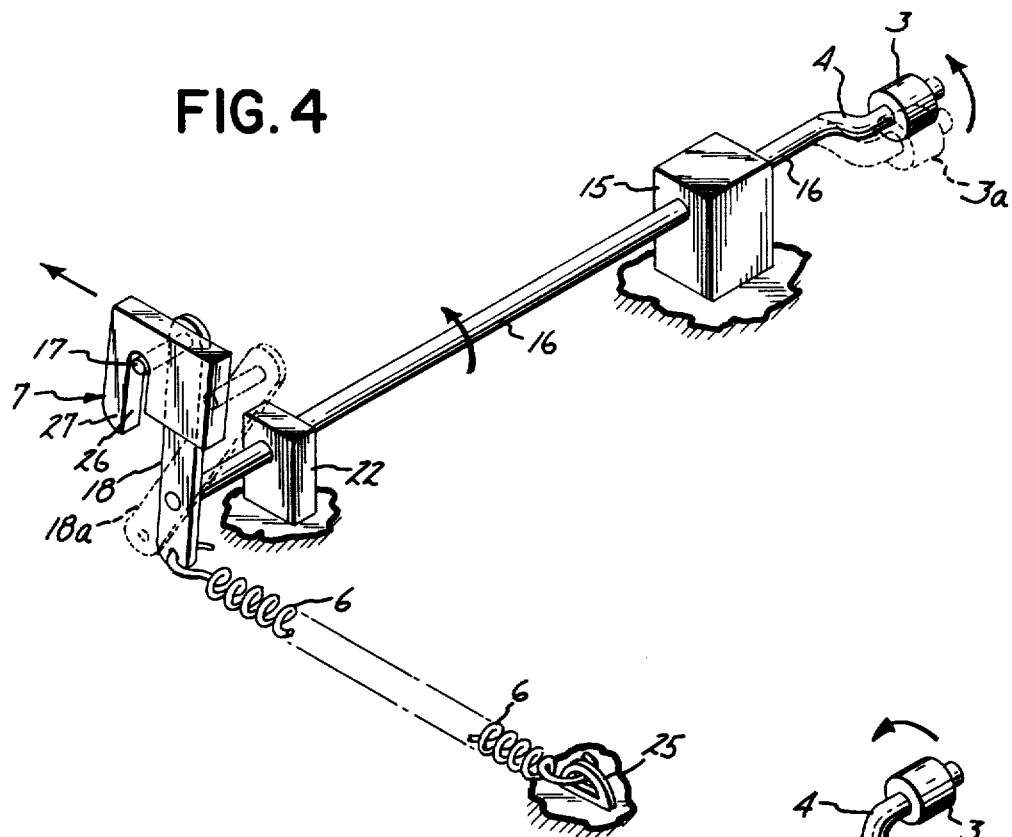
FIGS. 4 and 5 show the breakaway assistance linkage in perspective and unobscured by any part of the drive unit.
Figure 5:
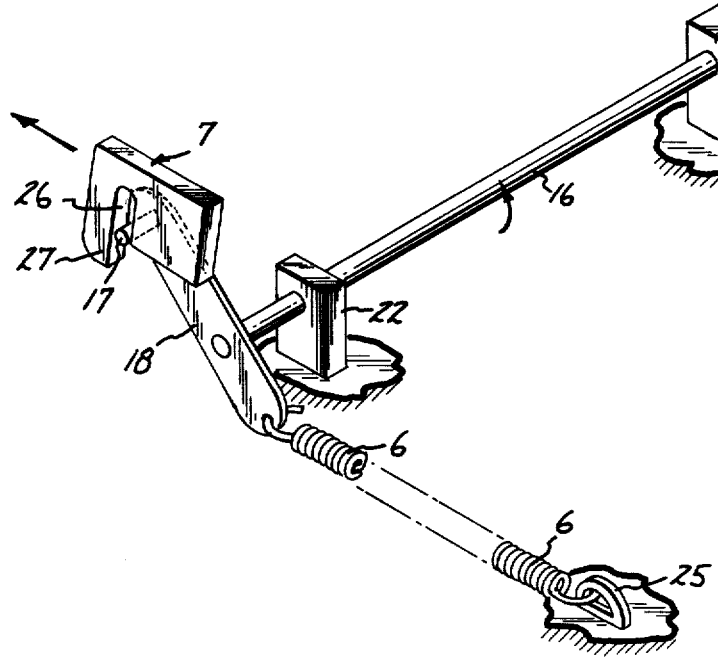

Our preferred solution to this problem is incorporated in the apparatus, shown detached from the disk drive in which it is employed in FIGS. 4 and 5. The apparatus itself comprises a shaft 16 having a pair of levers or cranks 4 and 18 rigidly mounted at opposite ends thereof, and having first and second positions, shown respectively in FIG. 1 and FIG. 4 (dashed outline 18a), and in FIG. 3. Shaft 16 is journaled in pillow blocks 15 and 22, said pillow blocks themselves being supported by deck 1 of the drive unit. Crank 4 is located beneath the housing of module 23 and carries on it roller 3 which will, when crank 18 is rotated to approximately its vertical position, contact the lower surface of module 23. Crank 18 carries at its upper end pin 17 projecting outwardly and parallel to shaft 16. Crank 18 also projects transversely past the connection point to shaft 16 to form an extension near the end of which is fastened one end of spring 6. Spring 6 is dead-ended at deck strap 25. An actuator 7 is permanently attached to carrier 13, positioned where its path intersects the path of pin 17 as crank 18 rotates.

In operation, when door 12 is pulled open bracket 11 pivots and link 10 begins to pull carrier 13 towards the port for door 12. Carrier 13 shifts actuator 7 in the direction of the arrow shown adjacent it in FIGS. 2 and 4. Pin 17 is initially confined in slot 26. Motion of actuator 27 causes pin 17 to slide in slot 26 causing arm 18 to pivot from its first position and rotate shaft 16. As shaft 16 rotates, crank 4 also rotates causing roller 3 to lift and press against the underside of module 23 while crank 4 is between its first and second positions. Further shifting of carrier 13 closer to the port in panel 21 causes additional lifting force to be placed on the underside of module 23 both by carrier 13 acting through pins 24, and by roller 3 being pressed against the bottom of module 23 by the movement of actuator 7 causing the rotation of shaft 16. Because of the straigthline profile of tracks 8 and 19 adjacent rollers 9 and 20 in FIG. 1 carrier 13 undergoes only straightline motion as an operator begins to open door 12. This motion allows crank 4 to swing part-way up from its first position to a position intermediate its first and second positions, and begin pressing roller 3 against module 23. When the ramp portions of slots 8 and 19 encounter rollers 9 and 20 respectively, additional force is generated to break module 23 away from its magnetic attachment to the disk drive spindle. The combination of the force from roller 3 and the force generated by the ramp portions of slots 8 and 19 are sufficient to easily and gently detach module 23. Preferably, the angle between cranks 4 and 18 is selected to cause breakaway while they are between their first and second positions. Because of flexibility in the bottom of module 23 and resiliencies throughout the linkage these two sources of breakaway force cooperate to provide the total amount of force needed.

As carrier 13 is shifted to the port for door 12, pin 17 will eventually slide out of slot 26 when carrier 13 has advanced slightly past the position in FIGS. 2 and 5 toward that of FIG. 3. Spring 6 is located to bias crank lever 18 toward a second position so that when door 12 is being reclosed and carrier 13 is moving away from panel 21, projection 27 on actuator 7 strikes pin 17 causing it to slide along the leftmost surface of slot 26 and eventually return to the first position shown in FIG. 1, and by dashed outline crank lever 18a in FIG. 4. Use of the spring 6 to maintain the second position of crank lever 18 when door 12 is completely opened is simply one of several ways to gain the correct re-engagement orientation of crank lever 18. A detent or pendulum arrangement will work equally well.

We claim:

1. In a disk memory drive of the type having a deck on which a rotatable drive spindle is accessible for magnetic coupling thereto of the disk hub contained in a replaceable disk module, a carrier frame, tracks mounting the carrier frame slidingly on the deck, said carrier frame supporting the module and slidingly conveying it between a position enabling the spindle to hub coupling and a position adjacent a module removal port, said tracks having ramp sections for lifting the carrier frame-supported module and detaching its hub from the spindle during movement of the carrier frame from the spindle to the port, and wherein said tracks and carrier frame incorporate a predetermined amount of free travel between the position of the carrier frame enabling the spindle to hub coupling and the onset of traversal of the tracks' ramp sections, an improvement for reducing the force needed for shifting the carrier frame along the tracks to break the disk hub from the spindle coupling, comprising:

(a) a lift mechanism mounted on the deck and at least partially between the deck and the module surface facing the deck and including a first lever moveable from a first position to a second position, a second lever, and a linkage portion connecting the first lever to the second lever, said second lever moved by force transmitted by the linkage portion from the first lever, from a first position exerting no substantial force on the disk hub and corresponding to the first lever's first position, to a second position exerting force on the disk hub directed axially away from the spindle and corresponding to a position of the first lever between its first and second positions; and (b) an actuator mounted on the carrier frame and engaging the first lever and moving it from its first to its second position when the carrier moves from its extreme spindle to hub coupling position to ramp section traversal, whereby the forces on the disk hub created by the second lever's and the carrier's movement combine to detach the hub from the spindle.

2. The improvement of claim 1 wherein the lift mechanism comprises a deck-journaled shaft carrying the first and second levers.

3. The improvement of claim 2, wherein the first lever includes a projection extending approximately parallel to the shaft's axis of rotation, and wherein the actuator includes a slot engaging the projection at an open end as the carrier frame moves towards its spindle to hub coupling position and shifting the first lever from its second to its first position, as the carrier frame reaches the spindle to hub coupling position.

4. The improvement of claim 3, further including means for biasing the first lever toward its second position.

5. The improvement of claim 3, wherein the second lever is oriented relative the first lever so as to press against the module housing, when the first lever is between its first and second positions.

6. The improvement of claim 5, further adapted for breaking from the spindle a disk hub contained in a module housing having a resiliently deflectable area of its surface facing the deck, wherein the second lever is positioned so as to press against the deflectable area of the housing.

* * * * *